United States Patent
Delanoy et al.

(10) Patent No.: US 7,041,192 B2
(45) Date of Patent: May 9, 2006

(54) COMPOSITE CARBON FIBER MATERIAL AND METHOD OF MAKING SAME

(75) Inventors: Curt Delanoy, N. Massapequa, NY (US); John Gillespie, Hockessin, DE (US)

(73) Assignee: Micro Contacts Inc., Hicksville, NY (US)

( * ) Notice: Subject to any disclaimer, the term of this patent is extended or adjusted under 35 U.S.C. 154(b) by 210 days.

(21) Appl. No.: 10/439,765

(22) Filed: May 16, 2003

(65) Prior Publication Data

US 2003/0203693 A1    Oct. 30, 2003

Related U.S. Application Data

(62) Division of application No. 09/899,782, filed on Jul. 5, 2001, now Pat. No. 6,759,352.

(51) Int. Cl.
    *C09J 5/00*    (2006.01)
(52) U.S. Cl. ................. 156/307.3; 156/307.7
(58) Field of Classification Search ............ 156/309.6, 156/307.3, 307.7; 442/366, 381
    See application file for complete search history.

(56) References Cited

U.S. PATENT DOCUMENTS

| | | | | |
|---|---|---|---|---|
| 5,344,689 A | * | 9/1994 | Ide et al. | 428/114 |
| 6,444,102 B1 | * | 9/2002 | Tucci et al. | 204/279 |
| 6,503,856 B1 | * | 1/2003 | Broadway et al. | 442/366 |

* cited by examiner

*Primary Examiner*—Jeff H. Aftergut
*Assistant Examiner*—John L. Goff
(74) *Attorney, Agent, or Firm*—Cooper & Dunham LLP

(57) ABSTRACT

A composite carbon fiber material is formed of one or more layers of carbon fiber material in which the carbon fibers are aligned all in the same direction and a mat of nonwoven, woven, or off-axis unidirectional carbon fibers are laminated together. Layers may be used individually or as a hybrid. The layers can be preimpregnated or impregnated during processing using thermoplastic or thermosetting resins. A layer of thermoplastic resin is applied either over the surface or within the composite structure, and the resin permeates the material so as to provide a more stable mechanical structure once the resin is processed. The material combines good mechanical strength with improved electrical current carrying properties when compared with the aligned carbon fiber layer alone. The layering sequence, layer type, and resin type can be specified to tailor electrical properties, mechanical properties, durability, and wear resistance. The resultant material achieves these results in substantially smaller material thickness than previously available.

4 Claims, 3 Drawing Sheets

COMPOSITE CARBON FIBER MATERIAL AND METHOD OF MAKING SAME

This is a division of prior application Ser. No. 09/899,782 filed Jul. 5, 2001, now U.S. Pat. No. 6,759,352.

BACKGROUND OF THE INVENTION

1. Field of the Invention

This invention relates generally to a thin-gauge composite material formed of layers of specialized carbon fibers and polymeric resins and, more particularly, to a composite carbon fiber material that is useful in an electrical contact assembly typically used in an electromechanical device.

2. Description of the Background

The use of carbon fiber material for structural applications is well known. Typically, this material is composed of multiple layers of either woven fabric or layers of unidirectional, continuous carbon fibers that are laminated together. The orientation and number of layers are chosen to meet the stiffness, strength, and dimensional stability requirements of the particular application. In typical aerospace applications the thin gauge material has between four to eight plies, with a thickness in the range of 0.030 to 0.060 inches. Various processing methods for applying heat and pressure to consolidate the layers of the carbon fiber reinforced thermoplastic and thermosetting composites include the use of autoclaves, presses, and pultrusion. These carbon fiber materials can be formed or shaped by stamping, cutting and machining. The thermoplastic composites can be successively processed, for example, consolidation can be followed by forming and welding. Although thin-gauge composite materials exist, they are not suitable for microelectronic applications presently under consideration.

In U.S. patent application Ser. No. 09/498,872, assigned to the assignee of this application and the disclosure of which is incorporated herein by reference, it is proposed that an electrical contact be formed of carbon fibers that are arranged in a side by side fashion and embedded in an electrically conductive matrix. Nevertheless, both the electrical characteristics and the mechanical characteristics of this carbon fiber electrical contact are seen to be subject to improvement.

Therefore, the need arises for improvements in carbon fiber materials.

OBJECTS SUMMARY OF THE INVENTION

Accordingly, it is an object of the present invention to provide an improved carbon fiber composite material that has similar mechanical properties as existing composites but with a smaller thickness, as well as providing good electrical conductivity, and in which the material is a composite formed of carbon fiber materials and elastomeric resin layers.

It is another object of the present invention to provide a composite carbon fiber material having a layer of aligned carbon fibers that has arranged on both flat sides thereof a nonwoven carbon fiber mat, woven fabric or off-axis unidirectional layers with the outer surfaces of the carbon fiber mats being finely coated with a polymeric resin.

A further object of the present invention is to provide a composite carbon fiber material having multiple layers of the carbon fibers that are aligned in a polymeric matrix and adhered together with the multiple layers then being laminated with mats formed of nonwoven carbon fibers, woven fabric or off-axis unidirectional layers, with the exterior surfaces of the mats being coated with a polymeric resin for forming the composite material into a stable structure.

In accordance with one aspect of the present invention the carbon fibers that are aligned and bound in a polymeric matrix are combined between two nonwoven carbon fiber mats, woven fabric or off-axis unidirectional layers. The nonwoven carbon fiber mats, woven fabric, or off-axis unidirectional layers provide improved mechanical strength and stability to the aligned carbon fiber layer and also provide a primary current carrying capability to aid in the overall electrical conductivity of the composite material. Unidirectional electrical conductivity can be achieved by using two methods: carbon fiber to carbon fiber contact between the individual layers that is applicable to both non-conductive and conductive polymers; and/or by adding conductive materials to the resin layer or layers. The fabrication techniques utilized in making the composite material create a network of connections between the differently oriented carbon fibers to provide the desired electrical conductivity. The extent of this conductivity is regulated by the resin volume fraction and may be increased by introducing conductive particles into the resin layer or layers of the composite.

The unidirectional carbon fiber layer is used for carrying electrical current along a primary axis as well as creating mechanical stability along that axis. Used alone, however, this material provides no off-axis electrical conductivity and has virtually no off-axis mechanical stability. The present invention teaches the use of a nonwoven fabric, woven fabric and off-axis unidirectional layer of carbon fibers to provide off axis current carrying capabilities, as well as adding off-axis mechanical stability.

The layer or layers of resin provide additional bonding material for the additional carbon fiber layers and control the overall composition of the material. By varying the ratio of insulative resin to carbon fiber, the mechanical and electrical properties of the composite can be tailored to meet a variety of applications. Also, by introducing and varying the ratio of conductive particles to the resin layer or layers the total electrical conductivity can be increased to be above that which can be achieved by the network of carbon fibers alone.

The invention can contain one or more layers of each of the above-described components depending on the desired electrical and mechanical properties specified and the material layering pattern may be changed depending on the application requirements. By using the above layers of carbon fibers and elastomerics, the resulting composite material can be fabricated at a thickness of less than 0.010 inch.

The above and other objects, features and advantages of the present invention will become apparent from the following detailed description of illustrative embodiments thereof to be read in conjunction with the accompanying drawings.

DETAILED DESCRIPTION OF THE PREFERRED EMBODIMENTS

Figure 1:
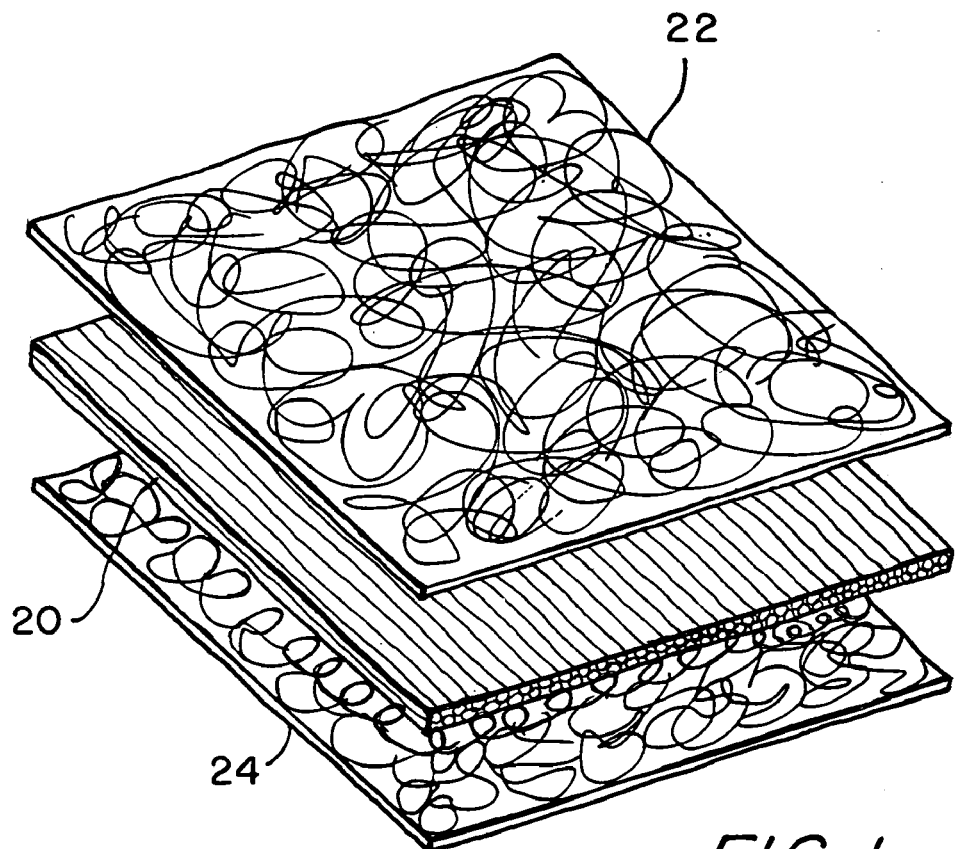
FIG. 1 is an exploded view showing some of the various layers of the composite material relative to each other.

In FIG. 1 an exploded view of the inventive composite carbon fiber material is shown in which a central layer 20 is formed of aligned carbon fibers that are held together by a plastic matrix. Arranged on either side of the central layer 20 are mats 22 and 24 that are formed of nonwoven carbon. These mats 22, 24 are ultrathin carbon fiber material that is extremely light weight and uniform and is substantially isotropic, because there is almost no directionality of the fibers in the plane of the nonwoven carbon fiber fabric.

As noted, the nonwoven carbon fiber mat is an ultrathin material and is generally available having a thickness from 0.08 mm to 0.79 mm. In that regard, one commercial source for this nonwoven carbon fiber mat or material is the Hollingsworth & Vose Company, 112 Washington Street, East Walpole, Mass. 02032.

Figure 2:
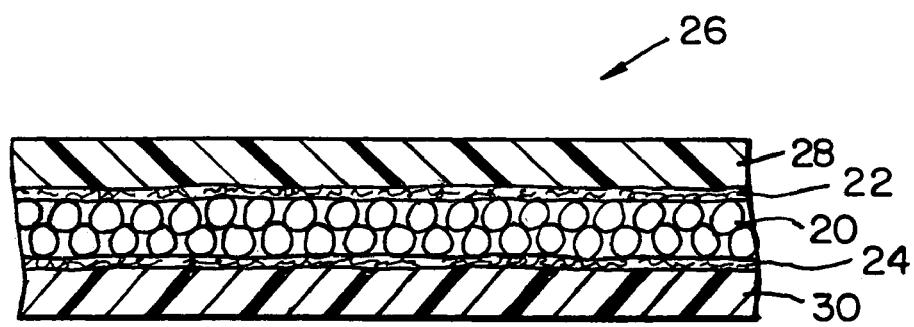
FIG. 2 is an end view of the inventive composite material showing all of the constituent layers thereof.

The composite material is formed as shown in FIG. 2, in which following the arrangement of the mats 22, 24 over the aligned carbon fiber central layer 20 a thermoplastic resin or polymer is coated over the exterior surfaces of each mat. This forms layer 26 over mat 24 and layer 28 over mat 22. The thermoplastic resin layers 28 and 30 serve to bind or adhere the nonwoven carbon fiber mats 22, 24 to the respective outer surfaces of the central layer 20 formed of the aligned carbon fibers.

Figure 3:
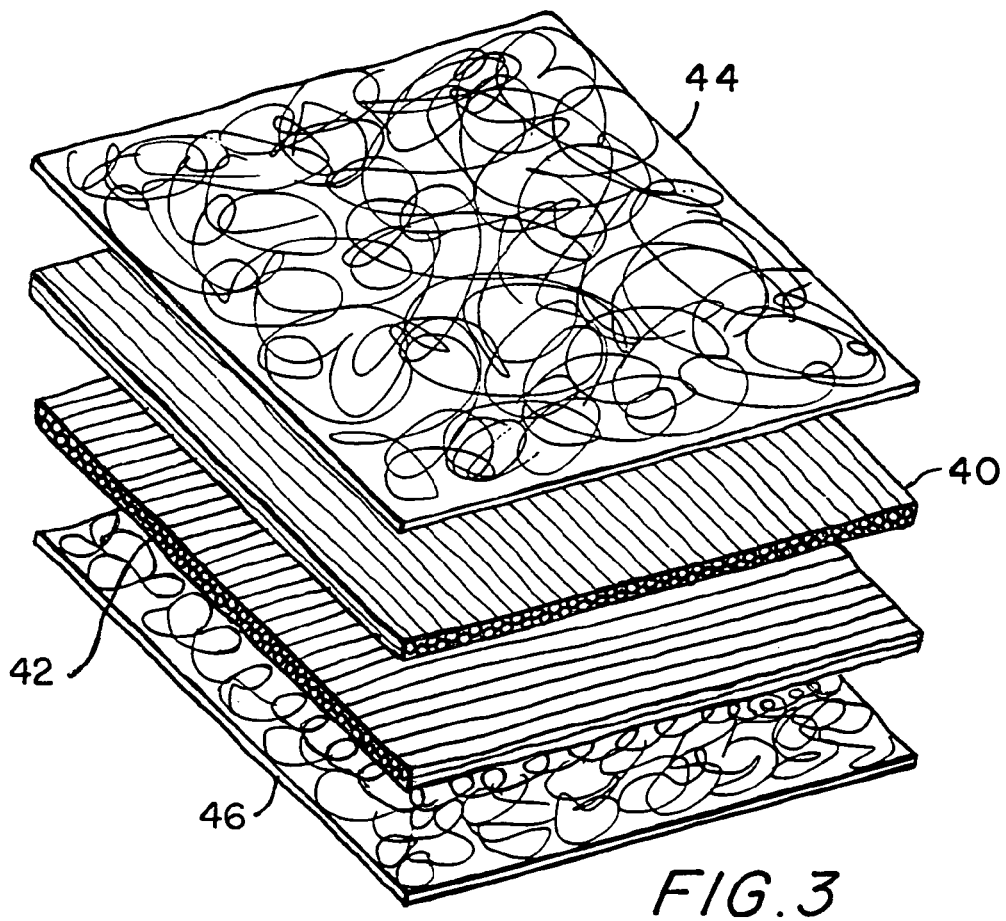
FIG. 3 is an exploded view of another embodiment of the material according to the present invention in which two layers of aligned carbon fibers are arranged between two nonwoven carbon fiber mats.

In another embodiment of the present invention, the central layer of carbon fibers is duplicated, however, the direction of the carbon fibers is changed so that the carbon fibers are at right angles to each other in the successive central layers. More specifically, as shown in FIG. 3, a central layer of aligned carbon fibers 40 is provided and a second central layer of aligned carbon fibers 42 is placed to be coextensive with the first layer, however, in layer 42 the direction of the longitudinal length of the carbon fibers is substantially perpendicular to the direction of the longitudinal length of the carbon fibers in layer 40. The two layers 40 and 42 may be adhered to each other with a small amount of thermoplastic resin. Thereafter a nonwoven carbon layer 44 is arranged over the aligned carbon fiber layer 40 and a second nonwoven carbon fiber mat 46 is arranged over the aligned carbon fiber layer 42.

Figure 4:
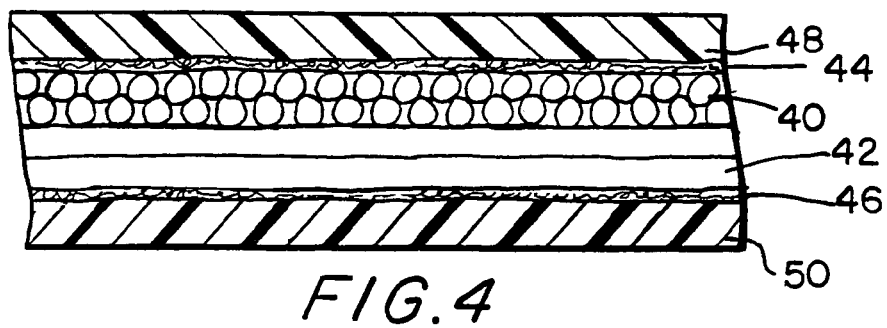
FIG. 4 is an edge view of a composite material formed according to the embodiment of FIG. 3.

It is understood that the showing in FIG. 3 is an in-process assembly and is not the final composite material, which in fact is shown in an edge view in FIG. 4. As seen in FIG. 4, a thermoplastic resin layer 48 is applied over the nonwoven carbon fiber mat 44 and a similar thermoplastic resin layer 50 is applied over the nonwoven carbon fiber layer 46. The effect of these thermoplastic resin layers 48, 50 is to form a stable material by causing adherence between each mat and its respective carbon fiber layer. Some of that same material, although not seen in FIG. 4 would also be applied between the respective carbon fiber layers 40, 42 to bond those two layers to each other.

Figure 5:
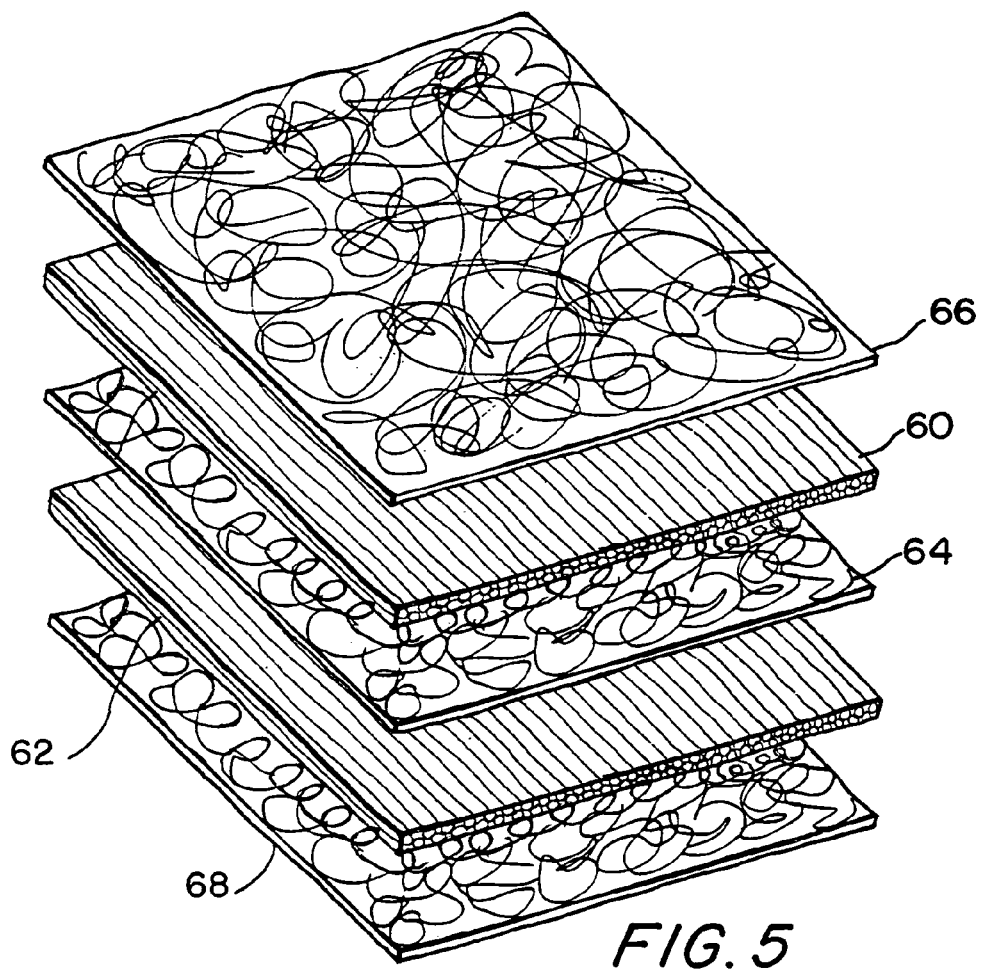
FIG. 5 is an exploded view of another embodiment of a composite material according to the present invention in which there are two layers of aligned carbon fibers in combination with three nonwoven carbon fiber mats.

In another embodiment shown in FIG. 5, multiple layers of the aligned carbon fibers are again provided. In this embodiment, both layers of the aligned carbon fiber structure have the fibers aligned in the same direction. Specifically, a first carbon fiber layer 60 is provided and a second carbon layer 62 is provided, however, a nonwoven carbon fiber mat 64 is interposed between the two carbon fiber layers 60, 62. As in the previous embodiment, a small amount of thermoplastic resin, not seen in FIG. 5, would be applied to both sides of the nonwoven carbon fiber mat 64 in order to form a centrally arranged composite material. Thereafter, additional carbon fiber mats are provided on the outer surfaces of the carbon fiber layers 60 and 62. More particularly, a nonwoven carbon fiber mat 66 is provided on an exterior surface of aligned carbon fiber layer 60 and a second nonwoven carbon fiber mat 68 is provided on an exterior surface of the aligned carbon fiber layer 62, in which the fibers are aligned in the same direction as carbon fiber layer 60.

Figure 6:
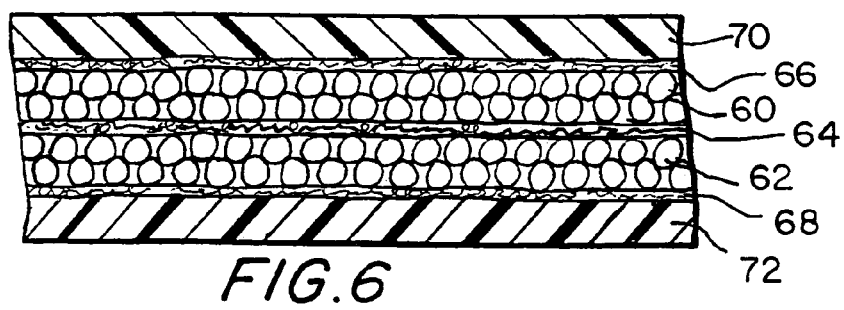
FIG. 6 is an edge view of a completed composite material formed according to the embodiment of FIG. 5.

FIG. 6 shows the composite material finally assembled in the order of the layers as shown in FIG. 5, in which a thermoplastic resin layer 70 is applied on the exterior surface of nonwoven carbon fiber mat 66 and a thermoplastic resin layer 72 is applied on an exterior surface of nonwoven carbon fiber mat 68.

One advantageous use for the above-described composite carbon fiber material is the manufacture of electrical contacts that conduct electricity and have a dynamic relationship to a resistive path. Therefore, the inventive composite carbon fiber material has been found to provide improved current carrying capabilities because the nonwoven carbon fiber mats provide a primary current carrying capability and, moreover, the composite carbon fiber material has improved mechanical strength so that the resiliency required of such electrical contacts is improved by use of this composite material.

It should be understood that, although not seen in the edge views of FIGS. 2, 4, and 6, a small amount of the thermoplastic resin that forms the exterior coatings of the composite material may also be applied between the internal layers in order to make certain that all layers are firmly bonded, one to another.

It is understood of course that the foregoing description is presented by way of example only and is not intended to limit the spirit or scope of the present invention, which is to be defined by the appended claims.

What is claimed is:

1. A method of making a composite carbon fiber material, comprising the steps of:

forming a central layer of a plurality of non-metallic carbon fibers aligned in a common direction and adhered to one another by an electrically conductive resin matrix;

arranging a first nonwoven carbon fiber mat in which the fibers are randomly arranged in the plane of the nonwoven carbon fiber mat on a first flat surface of the central layer;

arranging a second nonwoven carbon fiber mat in which the fibers are randomly arranged in the plane of the nonwoven carbon fiber mat on a second flat surface of the central layer;

coating an exterior surface of the first nonwoven carbon fiber mat with a layer of a thermoplastic resin;

causing the thermoplastic resin to penetrate through the first nonwoven carbon fiber mat to the first flat surface of the central layer;

coating an exterior surface of the second nonwoven carbon fiber mat with a layer of the thermoplastic resin; and causing the thermoplastic resin to penetrate through the second nonwoven carbon fiber mat to the second flat surface of the central layer.

2. The method of making a composite carbon fiber material according to claim 1, comprising the further step of:
selecting the first nonwoven carbon fiber mat and the second nonwoven carbon fiber mat to have a thickness in a range of 0.08 mm to 0.79 mm.

3. The method of making a composite carbon fiber material according to claim 1, wherein the step of forming a central layer comprises:
forming a first layer of a plurality of carbon fibers aligned in a first common direction and adhered to one another by an electrically conductive resin matrix;
forming a second layer of a plurality of carbon fibers aligned in a second direction and adhered to one another by an electrically conductive resin matrix, wherein the second direction is chosen to be substantially perpendicular to the first direction; and
adhering the first layer to the second layer with a thermoplastic resin.

4. The method of making a composite carbon fiber material according to claim 3 comprising the further step of arranging a third nonwoven carbon fiber mat between the first layer and the second layer before adhering the first layer to the second layer.

* * * * *

UNITED STATES PATENT AND TRADEMARK OFFICE
CERTIFICATE OF CORRECTION

PATENT NO. : 7,041,192 B2 Page 1 of 1
APPLICATION NO. : 10/439765
DATED : May 9, 2006
INVENTOR(S) : Curt Delanoy and John Gillespie It is certified that error appears in the above-identified patent and that said Letters Patent is hereby corrected as shown below:

Replace column 3, line 24 with the following:

--0.008 mm to 0.79 mm. In that regard, one commercial source--.

Replace column 5, line 8 with the following:

-- in a range of 0.008 mm to 0.79 mm--.

Signed and Sealed this

Fourteenth Day of November, 2006

JON W. DUDAS
*Director of the United States Patent and Trademark Office*